US012553394B2

(12) United States Patent
Ito et al.

(10) Patent No.: US 12,553,394 B2
(45) Date of Patent: Feb. 17, 2026

(54) GAS TURBINE COMBUSTOR HAVING A FIRST COMBUSTION ZONE RECEIVING MULTIPLE FUELS AND A SECOND COMBUSTION ZONE RECEIVING A FUEL NOT CONTAINING NITROGEN ATOMS

(71) Applicant: IHI Corporation, Tokyo (JP)

(72) Inventors: Shintaro Ito, Tokyo (JP); Masahiro Uchida, Tokyo (JP)

(73) Assignee: IHI CORPORATION, Tokyo (JP)

( * ) Notice: Subject to any disclaimer, the term of this patent is extended or adjusted under 35 U.S.C. 154(b) by 50 days.

(21) Appl. No.: 18/886,005

(22) Filed: Sep. 16, 2024

(65) Prior Publication Data

US 2025/0003594 A1 Jan. 2, 2025

Related U.S. Application Data (63) Continuation of application No. PCT/JP2022/045091, filed on Dec. 7, 2022.

(30) Foreign Application Priority Data

Mar. 25, 2022 (JP) ................. 2022-049708

(51) Int. Cl.
*F23R 3/34* (2006.01)
*F02C 9/26* (2006.01)
(Continued)

(52) U.S. Cl.
CPC ............... *F02C 9/263* (2013.01); *F02C 9/28* (2013.01); *F02C 9/40* (2013.01); *F23R 3/34* (2013.01);
(Continued)

(58) Field of Classification Search
CPC .... F02C 9/263; F02C 9/28; F02C 9/40; F23R 3/34; F23R 3/346; F23R 3/36
See application file for complete search history.

(56) References Cited

U.S. PATENT DOCUMENTS 5,609,016 A * 3/1997 Yamada ............... F02C 3/22
60/39.465
6,047,550 A 4/2000 Beebe
(Continued)

FOREIGN PATENT DOCUMENTS

JP S61-079914 A 4/1986
JP 3012166 B2 2/2000
(Continued)

*Primary Examiner* — William H Rodriguez (57) ABSTRACT

A combustion system includes: a combustor including a first combustion region and a second combustion region continuous with the first combustion region on a downstream side thereof; a first burner including an injection portion of ammonia as first fuel, the injection portion facing the first combustion region, and a first injection portion of second fuel not containing nitrogen atoms, the first injection portion facing the first combustion region; a second burner including a second injection portion of the second fuel, the second injection portion facing the second combustion region; and a control device that adjusts a second fuel flow rate ratio between a flow rate of the second fuel injected from the first injection portion and a flow rate of the second fuel injected from the second injection portion.

10 Claims, 4 Drawing Sheets (51) Int. Cl.
*F02C 9/28* (2006.01)
*F02C 9/40* (2006.01)
*F23R 3/36* (2006.01)
*F23R 3/14* (2006.01)
*F23R 3/28* (2006.01)

(52) U.S. Cl.
CPC ............. *F23R 3/346* (2013.01); *F23R 3/36* (2013.01); *F23R 3/14* (2013.01); *F23R 3/286* (2013.01)

(56) References Cited

U.S. PATENT DOCUMENTS

| | | | |
|---|---|---|---|
| 6,192,688 B1 | 2/2001 | Beebe | |
| 8,701,382 B2 * | 4/2014 | Davis, Jr | F23N 1/002 |
| | | | 60/734 |
| 9,400,113 B2 * | 7/2016 | Ogata | F23R 3/286 |
| 9,638,423 B2 * | 5/2017 | Ogata | F02C 9/40 |
| 11,566,790 B1 * | 1/2023 | Hughes | F23R 3/20 |
| 2001/0049932 A1 | 12/2001 | Beebe | |
| 2007/0051109 A1 * | 3/2007 | Sonoda | F02C 9/28 |
| | | | 60/773 |
| 2009/0217672 A1 | 9/2009 | Bulat et al. | |
| 2010/0095649 A1 * | 4/2010 | Blouch | F23R 3/36 |
| | | | 60/39.463 |
| 2011/0094239 A1 | 4/2011 | Koizumi et al. | |
| 2011/0100018 A1 | 5/2011 | Nakamura | |
| 2015/0118014 A1 * | 4/2015 | Elward | F02C 9/28 |
| | | | 700/287 |
| 2015/0275755 A1 * | 10/2015 | Ogata | F23R 3/286 |
| | | | 60/737 |
| 2015/0345402 A1 * | 12/2015 | Crothers | F23R 3/346 |
| | | | 60/776 |
| 2015/0362194 A1 * | 12/2015 | Ogata | F23R 3/286 |
| | | | 60/39.463 |
| 2016/0033131 A1 * | 2/2016 | Ogata | F23R 3/46 |
| | | | 60/737 |
| 2017/0307210 A1 * | 10/2017 | Hirano | F23C 3/002 |
| 2017/0321609 A1 * | 11/2017 | Ogata | F02C 7/228 |
| 2017/0356656 A1 * | 12/2017 | Ogata | F23R 3/28 |
| 2018/0328588 A1 * | 11/2018 | Lemon | F23R 3/36 |
| 2019/0242581 A1 * | 8/2019 | Abe | F23R 3/18 |
| 2021/0199298 A1 | 7/2021 | Berry | |
| 2021/0381443 A1 * | 12/2021 | Otsuka | F02C 9/54 |
| 2023/0094065 A1 * | 3/2023 | Yoshida | F02C 9/26 |
| | | | 60/734 |
| 2023/0228425 A1 * | 7/2023 | Liu | F23R 3/44 |
| | | | 60/734 |
| 2025/0067436 A1 * | 2/2025 | Akula | F23R 3/286 |

FOREIGN PATENT DOCUMENTS

| | | |
|---|---|---|
| JP | 4049209 B2 | 2/2008 |
| JP | 2010-019195 A | 1/2010 |
| JP | 2012-141078 A | 7/2012 |
| JP | 2016-003852 A | 1/2016 |
| JP | 2016-191507 A | 11/2016 |
| JP | 6906381 B2 | 7/2021 |
| JP | 2021-110529 A | 8/2021 |

\* cited by examiner

GAS TURBINE COMBUSTOR HAVING A FIRST COMBUSTION ZONE RECEIVING MULTIPLE FUELS AND A SECOND COMBUSTION ZONE RECEIVING A FUEL NOT CONTAINING NITROGEN ATOMS

CROSS REFERENCE TO RELATED APPLICATIONS

This application is a continuation application of International Application No. PCT/JP2022/045091, filed on Dec. 7, 2022, which claims priority to Japanese Patent Application No. 2022-049708, filed on Mar. 25, 2022, the entire contents of which are incorporated by reference herein.

BACKGROUND ART

Technical Field

The present disclosure relates to a combustion system. The present application claims the benefit of priority based on Japanese Patent Application No. 2022-049708 filed on Mar. 25, 2022, the content of which is incorporated herein.

Related Art

Combustion systems such as turbine systems, with which power is obtained by combusting fuel in a combustor, are used. Some of the combustion systems such as gas turbine systems use, for example, ammonia as fuel as disclosed in Patent Literature 1. By using ammonia as fuel, carbon dioxide emission is suppressed.

CITATION LIST

Patent Literature

Patent Literature 1: JP 2016-191507 A

SUMMARY

Technical Problem

In a combustion system using ammonia as fuel, in addition to ammonia as first fuel, second fuel containing no nitrogen atoms, such as natural gas, may be used in combination. The flame temperature of the second fuel such as natural gas is higher than the flame temperature of ammonia. Therefore, for example, in a case where the co-firing ratio, which is the ratio of the calorific value of ammonia to the total calorific value of ammonia and the second fuel, is low, it is desired to suppress damages to devices such as a burner due to the flame.

An object of the present disclosure is to provide a combustion system capable of suppressing damages to devices due to the flame.

Solution to Problem

In order to solve the above problem, a combustion system according to the present disclosure includes: a combustor including a first combustion region and a second combustion region continuous with the first combustion region on a downstream side of the first combustion region; a first burner including an injection portion of ammonia as first fuel, the injection portion of ammonia facing the first combustion region, and a first injection portion of second fuel not containing nitrogen atoms, the first injection portion facing the first combustion region; a second burner including a second injection portion of the second fuel, the second injection portion facing the second combustion region; and a control device that adjusts a second fuel flow rate ratio that is a ratio between a flow rate of the second fuel injected from the first injection portion and a flow rate of the second fuel injected from the second injection portion.

The control device may adjust the second fuel flow rate ratio on the basis of the temperature of the first combustion region.

The control device may adjust the second fuel flow rate ratio on the basis of a co-firing ratio that is a ratio of a calorific value of the ammonia to a total calorific value of the ammonia and the second fuel.

An engine including the combustor may be included, and the control device may adjust the second fuel flow rate ratio on the basis of a load of the engine.

The control device may adjust the second fuel flow rate ratio on the basis of the total calorific value of the ammonia and the second fuel.

The first burner may include: an injection portion of air, the injection portion of air facing the first combustion region; and a swirling portion that swirls the air injected from the injection portion of air.

Effects

According to the present disclosure, damage to a device due to flame can be suppressed.

DESCRIPTION OF EMBODIMENTS

Embodiments of the present disclosure will be described below by referring to the accompanying drawings. Dimensions, materials, other specific numerical values, and the like illustrated in the embodiments are merely an example for facilitating understanding, and the present disclosure is not limited thereto unless otherwise specified. Note that, in the present specification and the drawings, components having substantially the same function and structure are denoted by the same symbol, and redundant explanations are omitted. Illustration of components not directly related to the present disclosure is omitted.

Figure 1:
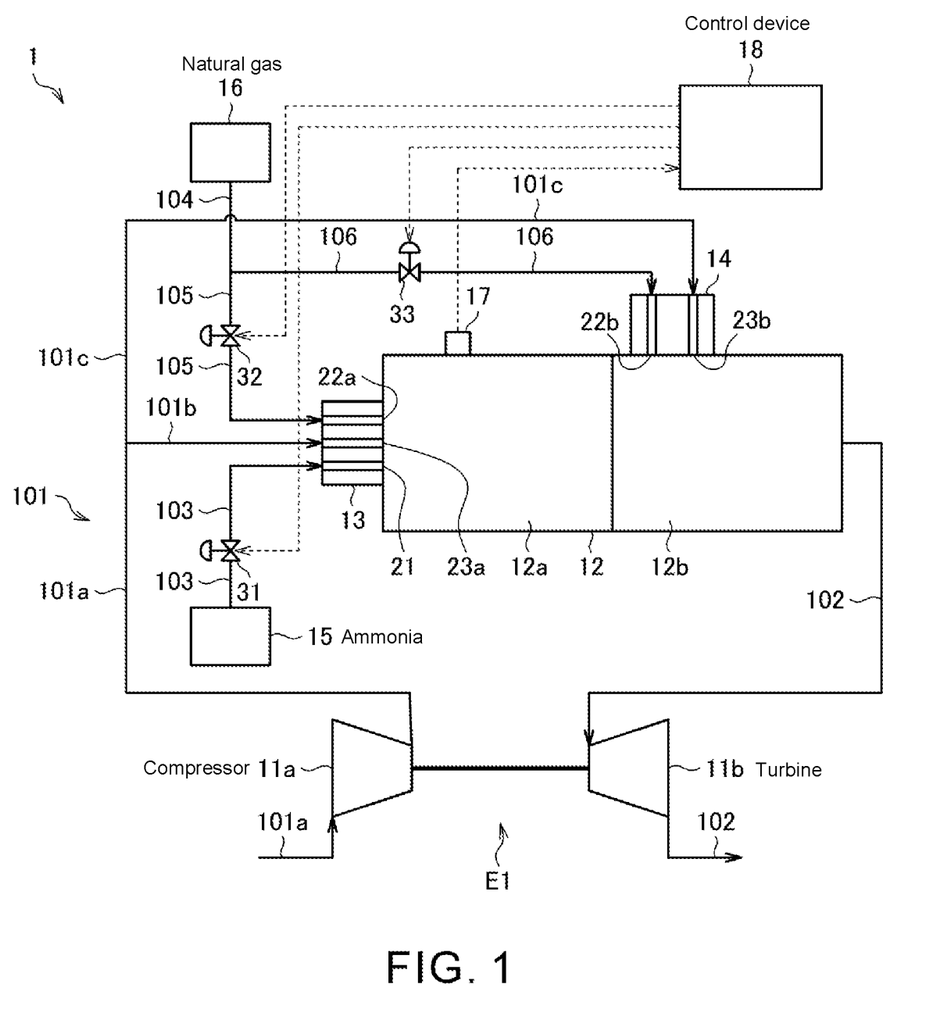
FIG. 1 is a schematic diagram illustrating a configuration of a combustion system according to an embodiment of the present disclosure.

FIG. 1 is a schematic diagram illustrating a configuration of a combustion system 1 according to the present embodiment. The combustion system 1 is a gas turbine system corresponding to an example of combustion system that generates energy by burning fuel. As illustrated in FIG. 1, the combustion system 1 includes a compressor 11a, a turbine 11b, a combustor 12, a first burner 13, a second burner 14, an ammonia supply source 15, a natural gas supply source 16, a temperature sensor 17, and a control device 18. The combustion system 1 also includes an engine E1 including the compressor 11a, the turbine 11b, and the combustor 12. The engine E1 is a gas turbine engine.

The compressor 11a and the turbine 11b rotate in an integrated manner. The compressor 11a and the turbine 11b are connected to each other by a shaft.

The compressor 11a is provided in an intake flow path 101 connected with the combustor 12. The air supplied to the combustor 12 flows through the intake flow path 101. An intake port (not illustrated) through which the air is taken in from the outside is provided at an upstream end of the intake flow path 101. The air taken in from the intake port passes through the compressor 11a and is sent to the combustor 12. The compressor 11a compresses the air and discharges the air to the downstream side.

The turbine 11b is provided in an exhaust flow path 102 connected with the combustor 12. Exhaust gas discharged from the combustor 12 flows through the exhaust flow path 102. The exhaust gas discharged from the combustor 12 passes through the turbine 11b and is sent to the downstream side with respect to the turbine 11b in the exhaust flow path 102. The turbine 11b generates rotational power by being turned by the exhaust gas.

A generator (not illustrated) is connected to the compressor 11a. The rotational power transmitted from the turbine 11b to the compressor 11a is used for power generation by the generator.

As will be described later, air, ammonia, and natural gas can be each supplied to the combustor 12. Air compressed by the compressor 11a is supplied to the combustor 12 from the intake flow path 101. In the combustor 12, combustion is performed using at least one of ammonia and natural gas as fuel. That is, in the combustor 12, both ammonia and natural gas may be used as fuel, or only either one of ammonia or natural gas may be used as fuel. Ammonia corresponds to the first fuel. The natural gas corresponds to an example of the second fuel containing no nitrogen atoms. However, the second fuel is not limited to natural gas. The second fuel may be, for example, natural gas, hydrogen or kerosene, or a combination thereof. The exhaust gas generated in the combustor 12 is discharged to the exhaust flow path 102.

The combustor 12 includes a first combustion region 12a and a second combustion region 12b as a combustion region where the fuel burns. The first combustion region 12a is located upstream of the second combustion region 12b in a gas flow direction in the combustor 12. The second combustion region 12b is continuous with the first combustion region 12a on a downstream side thereof. The combustion region including the first combustion region 12a and the second combustion region 12b is, for example, a space defined by a cylindrical wall. The upstream side of the space corresponds to the first combustion region 12a, and the downstream side of the space corresponds to the second combustion region 12b. The exhaust flow path 102 described above is connected to the downstream end of the second combustion region 12b. The combustor 12 is provided with the first burner 13 and the second burner 14 as burners for injecting fuel and air for forming flame into each of the combustion regions.

The first burner 13 faces the first combustion region 12a and injects fuel and air into the first combustion region 12a. The first burner 13 is provided at the upstream end of the first combustion region 12a. Illustrated in FIG. 1 is an example in which the number of the first burners 13 is one. However, the number of the first burners 13 may be plural. The positional relationship among the plurality of first burners 13 is not limited. For example, the plurality of first burners 13 may be provided at intervals in the circumferential direction of the first combustion region 12a. The first burner 13 includes an ammonia injection portion 21, a natural gas injection portion 22a, and an air injection portion 23a. Each of these injection portions faces the first combustion region 12a. That is, fuel or air is injected from these injection portions to the first combustion region 12a.

Specifically, the ammonia injection portion 21 includes a flow path through which ammonia is supplied and which communicates with the first combustion region 12a. The ammonia supplied to the flow path is injected into the first combustion region 12a. Specifically, the natural gas injection portion 22a includes a flow path through which natural gas is supplied and which communicates with the first combustion region 12a. The natural gas supplied to the flow path is injected into the first combustion region 12a. Specifically, the air injection portion 23a includes a flow path through which air is supplied and which communicates with the first combustion region 12a. The air supplied to the flow path is injected into the first combustion region 12a.

The second burner 14 faces the second combustion region 12b and injects fuel and air into the second combustion region 12b. The second burner 14 is provided on a side portion of the second combustion region 12b. Illustrated in FIG. 1 is an example in which the number of the second burners 14 is one. However, the number of the second burners 14 may be plural. The positional relationship among the plurality of second burners 14 is not limited. For example, the plurality of second burners 14 may be provided at intervals in the circumferential direction of the second combustion region 12b. The second burner 14 includes a natural gas injection portion 22b and an air injection portion 23b. Each of these injection portions faces the second combustion region 12b. That is, fuel or air is injected from these injection portions to the second combustion region 12b.

Specifically, the natural gas injection portion 22b includes a flow path through which natural gas is supplied and which communicates with the second combustion region 12b. The natural gas supplied to the flow path is injected into the second combustion region 12b. Specifically, the air injection portion 23b includes a flow path to which air is supplied and which communicates with the second combustion region 12b. The air supplied to the flow path is injected into the second combustion region 12b.

Hereinafter, among the natural gas injection portions, the natural gas injection portion 22a of the first burner 13 is also referred to as a first injection portion 22a. Of the natural gas injection portions, the natural gas injection portion 22b of the second burner 14 is also referred to as a second injection portion 22b.

As described above, the compressor 11a compresses air and discharges the air. Air is supplied from the compressor 11a to the first burner 13 and the second burner 14 via the intake flow path 101. The intake flow path 101 includes a flow path 101a, a flow path 101b, and a flow path 101c. The compressor 11a is included in the flow path 101a. The flow path 101a branches into the flow path 101b and the flow path 101c on the downstream side of the compressor 11a.

The flow path 101b is connected with the air injection portion 23a of the first burner 13. Therefore, air can be supplied from the compressor 11a to the air injection portion 23a of the first burner 13 via the flow path 101a and the flow path 101b. The flow path 101c is connected with the air injection portion 23b of the second burner 14. Therefore, air can be supplied from the compressor 11a to the air injection portion 23b of the second burner 14 via the flow path 101a and the flow path 101c.

The ammonia supply source 15 is, for example, an ammonia tank that stores ammonia. The ammonia tank stores ammonia in a liquid state, for example. However, the ammonia supply source 15 is not limited to an ammonia tank. For example, the ammonia supply source 15 may be a device or the like that generates ammonia.

The ammonia supply source 15 is connected with the ammonia injection portion 21 of the first burner 13 via a flow path 103. Therefore, ammonia can be supplied from the ammonia supply source 15 to the ammonia injection portion 21 of the first burner 13 via the flow path 103. The supply of ammonia from the ammonia supply source 15 to the first burner 13 is implemented by, for example, a pump (not illustrated). The flow path 103 includes a flow rate control valve 31. The flow rate control valve 31 adjusts the flow rate of ammonia sent to the first burner 13 through the flow path 103. Specifically, the supply amount of ammonia to the first burner 13 is adjusted by adjusting the opening degree of the flow rate control valve 31.

The natural gas supply source 16 is, for example, a natural gas tank that stores natural gas. The natural gas tank stores natural gas in a liquid state, for example. However, the natural gas supply source 16 is not limited to a natural gas tank. For example, the natural gas supply source 16 may be a device that generates natural gas or the like.

The natural gas supply source 16 is connected with a flow path 104. The flow path 104 branches into a flow path 105 and a flow path 106. The flow path 105 is connected with the natural gas injection portion 22a of the first burner 13. Therefore, natural gas can be supplied from the natural gas supply source 16 to the natural gas injection portion 22a of the first burner 13 via the flow path 104 and the flow path 105. The flow path 106 is connected with the natural gas injection portion 22b of the second burner 14. Therefore, natural gas can be supplied from the natural gas supply source 16 to the natural gas injection portion 22b of the second burner 14 via the flow path 104 and the flow path 106. The supply of natural gas from the natural gas supply source 16 to the first burner 13 and the second burner 14 is implemented by, for example, a pump (not illustrated).

The flow path 105 includes a flow rate control valve 32. The flow rate control valve 32 adjusts the flow rate of natural gas sent to the first burner 13 through the flow path 105. Specifically, the supply amount of natural gas to the first burner 13 is adjusted by adjusting the opening degree of the flow rate control valve 32. The flow path 106 includes a flow rate control valve 33. The flow rate control valve 33 adjusts the flow rate of natural gas sent to the second burner 14 through the flow path 106. Specifically, the supply amount of natural gas to the second burner 14 is adjusted by adjusting the opening degree of the flow rate control valve 33.

The temperature sensor 17 detects the temperature of the first combustion region 12a of the combustor 12. The temperature sensor 17 is provided, for example, on a side portion of the first combustion region 12a.

The control device 18 includes a central processing unit (CPU), a ROM in which a program and others are stored, a RAM as a work area, and others. The function of the control device 18 is implemented by the central processing unit, the ROM, and the like. The control device 18 controls the operation of each device in the combustion system 1. For example, the control device 18 controls the operation of each of the flow rate control valves 31, 32, and 33. In addition, the control device 18 acquires information from the temperature sensor 17.

The control device 18 controls the flow rate of ammonia injected from the ammonia injection portion 21 of the first burner 13. Specifically, the control device 18 controls the flow rate of ammonia injected from the injection portion 21 of the first burner 13 by controlling the operation of the flow rate control valve 31.

The control device 18 controls the flow rate of natural gas injected from the first injection portion 22a which is the natural gas injection portion of the first burner 13. Specifically, the control device 18 controls the flow rate of natural gas injected from the first injection portion 22a of the first burner 13 by controlling the operation of the flow rate control valve 32.

The control device 18 controls the flow rate of natural gas injected from the second injection portion 22b which is the natural gas injection portion of the second burner 14. Specifically, the control device 18 controls the flow rate of natural gas injected from the second injection portion 22b of the second burner 14 by controlling the operation of the flow rate control valve 33.

As described above, the control device 18 can separately control the flow rate of ammonia injected from the injection portion 21 of the first burner 13, the flow rate of natural gas injected from the first injection portion 22a of the first burner 13, and the flow rate of natural gas injected from the second injection portion 22b of the second burner 14. Therefore, the control device 18 can control the ratio between the supply amount of ammonia to the combustor 12 and the supply amount of natural gas to the combustor 12. That is, the control device 18 can control the co-firing ratio that is the ratio of the calorific value of ammonia to the total calorific value of ammonia and natural gas in the combustor 12.

Furthermore, the control device 18 can adjust a natural gas flow rate ratio which is a ratio of the flow rate of natural gas injected from the natural gas first injection portion 22a of the first burner 13 and the flow rate of natural gas injected from the natural gas second injection portion 22b of the second burner 14. As described above, the second fuel is not limited to natural gas. Therefore, the natural gas flow rate ratio corresponds to an example of the second fuel flow rate ratio that is a ratio between the flow rate of the second fuel injected from the first injection portion 22a and the flow rate of the second fuel injected from the second injection portion 22b.

In the combustion system 1, when the temperature of the flame formed in the first combustion region 12a becomes excessively high, devices such as a liner of the combustor 12 or the first burner 13 may be damaged. For example, since the flame temperature of the second fuel such as natural gas is higher than the flame temperature of ammonia, if the natural gas is injected only from the first injection portion 22a of the first burner 13 in a case where the co-firing ratio is low, the temperature of the flame formed in the first combustion region 12a may become excessively high. For example, in a case where the load of the engine E1 is high, the total supply amount of fuel supplied to the combustor 12 increases, and thus injecting natural gas only from the first injection portion 22a of the first burner 13 may cause the temperature of the flame formed in the first combustion region 12a to become excessively high.

As described above, in the combustion system 1, the control device 18 adjusts the natural gas flow rate ratio, which is the ratio of the flow rate of the natural gas injected from the natural gas first injection portion 22a of the first burner 13 and the flow rate of the natural gas injected from the natural gas second injection portion 22b of the second burner 14. Therefore, it is possible to inject a part of the natural gas supplied to the combustor 12 from the second injection portion 22b of the second burner 14 without injecting all the natural gas supplied to the combustor 12 from the first injection portion 22a of the first burner 13. This makes it possible to suppress the temperature of the flame formed in the first combustion region 12a from becoming excessively high, and thus damages to devices due to the flame can be suppressed.

Hereinafter, processing related to adjustment of the natural gas flow rate ratio by the control device 18 will be described in detail with reference to FIGS. 2 and 3. The control device 18 adjusts the natural gas flow rate ratio based on, for example, the temperature of the first combustion region 12a. Hereinafter, an example in which the natural gas flow rate ratio is adjusted on the basis of the temperature of the first combustion region 12a will be described. However, as described later, the control device 18 may adjust the natural gas flow rate ratio on the basis of a parameter other than the temperature of the first combustion region 12a.

For example, in a case where the temperature of the first combustion region 12a is lower than an upper limit temperature, the control device 18 adjusts the natural gas flow rate ratio such that all the natural gas supplied to the combustor 12 is injected from the first injection portion 22a of the first burner 13 and that the natural gas is not injected from the second injection portion 22b of the second burner 14. Furthermore, in a case where the temperature of the first combustion region 12a reaches the upper limit temperature, the control device 18 adjusts the natural gas flow rate ratio such that a part of the natural gas supplied to the combustor 12 is injected from the second injection portion 22b of the second burner 14. The upper limit temperature can be set as appropriate in consideration of heat resistance and the like of each device in the vicinity of the first combustion region 12a.

Figure 2:
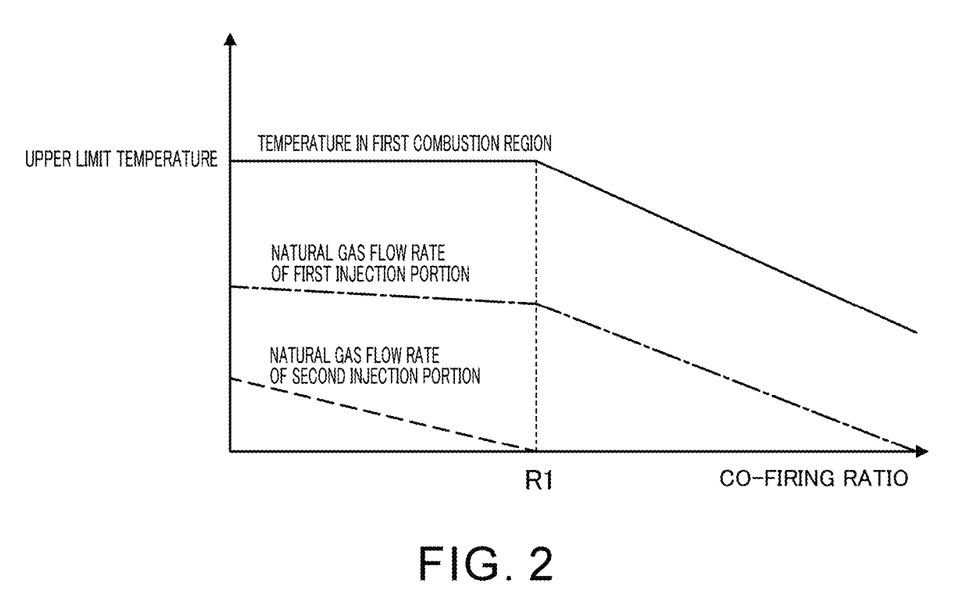
FIG. 2 is a graph illustrating an example of relationships between each of the temperature of a first combustion region, the natural gas flow rate of a first injection portion, and the natural gas flow rate of a second injection portion and the co-firing ratio in the combustion system according to the embodiment of the present disclosure.

FIG. 2 is a graph illustrating an example of relationships between each of the temperature of the first combustion region 12a, the natural gas flow rate of the first injection portion 22a, and the natural gas flow rate of the second injection portion 22b and the co-firing ratio in the combustion system 1. The natural gas flow rate of the first injection portion 22a means the flow rate of the natural gas injected from the first injection portion 22a of the first burner 13. The natural gas flow rate of the second injection portion 22b means the flow rate of the natural gas injected from the second injection portion 22b of the second burner 14. In FIG. 2, the temperature of the first combustion region 12a, the natural gas flow rate of the first injection portion 22a, and the natural gas flow rate of the second injection portion 22b are indicated by a solid line, an alternate long and short dash line, and a broken line, respectively.

The higher the co-firing ratio is, the higher the ratio of the total supply of ammonia to the total supply of fuel supplied to the combustor 12 is. On the other hand, the lower the co-firing ratio is, the higher the ratio of the total supply amount of natural gas to the total supply amount of fuel supplied to the combustor 12 is. In the example of FIG. 2, the load of the engine E1 is constant. In this case, the total calorific value of the fuel supplied to the combustor 12 is also substantially constant.

Referring to FIG. 2, a process in which the co-firing ratio decreases from a state of being high is examined. In the example of FIG. 2, a process in which the co-firing ratio changes from the right end to the left corresponds to the process in which the co-firing ratio decreases from the state of being high. In the example of FIG. 2, in a region where the co-firing ratio is higher than a value R1, the temperature of the first combustion region 12a is lower than the upper limit temperature. Therefore, all the natural gas supplied to the combustor 12 is injected from the first injection portion 22a of the first burner 13, and no natural gas is injected from the second injection portion 22b of the second burner 14. In the region where the co-firing ratio is higher than the value R1, the natural gas flow rate of the first injection portion 22a increases as the co-firing ratio decreases. Accordingly, in the region where the co-firing ratio is higher than the value R1, as the co-firing ratio decreases, the temperature of the first combustion region 12a also increases.

When the co-firing ratio reaches the value R1, the temperature of the first combustion region 12a reaches the upper limit temperature. Therefore, in the region where the co-firing ratio is lower than the value R1, a part of the natural gas supplied to the combustor 12 is injected from the second injection portion 22b of the second burner 14. Specifically, in the region where the co-firing ratio is lower than the value R1, the control device 18 adjusts the natural gas flow rate ratio such that the temperature of the first combustion region 12a is maintained at the upper limit temperature.

For example, in a case where the temperature of the first combustion region 12a exceeds the upper limit temperature due to a decrease in the co-firing ratio, the control device 18 adjusts the natural gas flow rate ratio in such a manner as to increase the natural gas flow rate ratio of the second injection portion 22b to the total flow rate of the natural gas. As a result, as illustrated in FIG. 2, in the region where the co-firing ratio is lower than the value R1, the ratio of the natural gas flow rate of the second injection portion 22b to the total flow rate of the natural gas increases as the co-firing ratio decreases. Accordingly, the temperature of the first combustion region 12a is maintained at the upper limit temperature. As illustrated in FIG. 2, in the region where the co-firing ratio is lower than the value R1, the natural gas flow rate of the first injection portion 22a increases as the co-firing ratio decreases. This suppresses a decrease in the temperature of the first combustion region 12a caused by a decrease in the flow rate of ammonia supplied to the first combustion region 12a from the ammonia injection portion 21 of the first burner 13 accompanied by a decrease in the co-firing ratio.

As described above, in the region where the temperature of the first combustion region 12a is lower than the upper limit temperature (namely, the region where the co-firing ratio is higher than the value R1), no natural gas is injected from the second injection portion 22b of the second burner 14, but all the natural gas supplied to the combustor 12 is injected from the first injection portion 22a of the first burner 13. As a result, an excessive decrease in the temperature of the first combustion region 12a is suppressed. Therefore, flame stability in the first combustion region 12a is secured.

Figure 3:
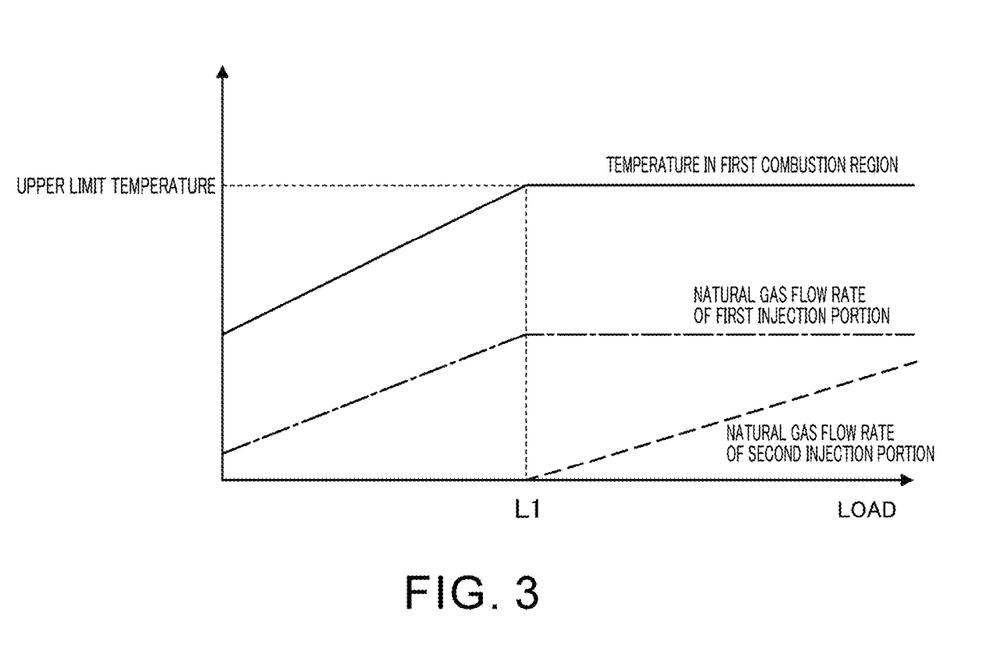
FIG. 3 is a graph illustrating an example of relationships between each of the temperature of the first combustion region, the natural gas flow rate of the first injection portion, and the natural gas flow rate of the second injection portion and the load of an engine in the combustion system according to the embodiment of the present disclosure.

FIG. 3 is a graph illustrating an example of relationships between each of the temperature of the first combustion region 12a, the natural gas flow rate of the first injection portion 22a, and the natural gas flow rate of the second injection portion 22b and the load of the engine E1 in the combustion system 1. In FIG. 3, similarly to FIG. 2, the temperature of the first combustion region 12*a*, the natural gas flow rate of the first injection portion 22*a*, and the natural gas flow rate of the second injection portion 22*b* are indicated by a solid line, an alternate long and short dash line, and a broken line, respectively.

The load of the engine E1 varies, for example, depending on a required value of the amount of power generated by the generator connected to the compressor 11*a*. The higher the load of the engine E1 is, the larger the total calorific value of the fuel supplied to the combustor 12 is. In the example of FIG. 3, the co-firing ratio is constant.

Referring to FIG. 3, a process in which the load of the engine E1 increases from a state of being small is examined. In the example of FIG. 3, a process in which the load of the engine E1 changes from the left end to the right corresponds to a process in which the load of the engine E1 increases from a state of being small. In the example of FIG. 3, in a region where the load of the engine E1 is smaller than a value L1, the temperature of the first combustion region 12*a* is lower than the upper limit temperature. Therefore, all the natural gas supplied to the combustor 12 is injected from the first injection portion 22*a* of the first burner 13, and no natural gas is injected from the second injection portion 22*b* of the second burner 14. In a region where the load of the engine E1 is smaller than the value L1, the natural gas flow rate of the first injection portion 22*a* increases as the load of the engine E1 increases. Accordingly, in the region where the load of the engine E1 is smaller than the value L1, as the load of the engine E1 increases, the temperature of the first combustion region 12*a* also increases.

When the load of the engine E1 reaches the value L1, the temperature of the first combustion region 12*a* reaches the upper limit temperature. Therefore, in the region where the load of the engine E1 is larger than the value L1, a part of the natural gas supplied to the combustor 12 is injected from the second injection portion 22*b* of the second burner 14. Specifically, in the region where the load of the engine E1 is larger than the value L1, the control device 18 adjusts the natural gas flow rate ratio such that the temperature of the first combustion region 12*a* is maintained at the upper limit temperature.

For example, in a case where the temperature of the first combustion region 12*a* exceeds the upper limit temperature due to an increase in the load of the engine E1, the control device 18 adjusts the natural gas flow rate ratio in such a manner as to increase the natural gas flow rate ratio of the second injection portion 22*b* to the total flow rate of the natural gas. As a result, as illustrated in FIG. 3, in the region where the load of the engine E1 is larger than the value L1, as the load of the engine E1 increases, the ratio of the natural gas flow rate of the second injection portion 22*b* to the total flow rate of the natural gas increases. Accordingly, the temperature of the first combustion region 12*a* is maintained at the upper limit temperature.

As described above, in the region where the temperature of the first combustion region 12*a* is lower than the upper limit temperature (namely, the region where the load of the engine E1 is smaller than the value L1), no natural gas is injected from the second injection portion 22*b* of the second burner 14, but all the natural gas supplied to the combustor 12 is injected from the first injection portion 22*a* of the first burner 13. As a result, an excessive decrease in the temperature of the first combustion region 12*a* is suppressed. Therefore, flame stability in the first combustion region 12*a* is secured. Even at the time of ignition when the amount of fuel input is small or immediately after ignition, no natural gas is injected from the second injection portion 22*b* of the second burner 14, and all the natural gas supplied to the combustor 12 is injected from the first injection portion 22*a* of the first burner 13. As a result, an excessive decrease in the temperature of the first combustion region 12*a* is suppressed, and stable ignition in the first combustion region 12*a* is achieved.

As described above, the control device 18 adjusts the natural gas flow rate ratio on the basis of the temperature of the first combustion region 12*a*. As a result, it is possible to suppress an excessive increase in the temperature of the flame formed in the first combustion region 12*a*. Specifically, in a case where the co-firing ratio is low or when the load of the engine E1 is large, it is possible to suppress the temperature of the first combustion region 12*a* from exceeding the upper limit temperature. Therefore, damages to devices due to the flame can be suppressed. Furthermore, it is possible to suppress an excessive decrease in the temperature of the first combustion region 12*a*. Specifically, in a case where the co-firing ratio is high or when the load of the engine E1 is small, it is possible to suppress an excessive decrease in the temperature of the first combustion region 12*a*. Therefore, flame stability in the first combustion region 12*a* is secured.

The example in which the natural gas flow rate ratio is adjusted on the basis of the temperature of the first combustion region 12*a* has been described above. However, the control device 18 may adjust the natural gas flow rate ratio on the basis of a parameter other than the temperature of the first combustion region 12*a*.

The control device 18 may adjust the natural gas flow rate ratio on the basis of the co-firing ratio. For example, information of the co-firing ratio that changes in accordance with a preset schedule is input to the control device 18. The control device 18 can acquire the co-firing ratio using the information. For example, in a case where the co-firing ratio is higher than the value R1 in FIG. 2, the control device 18 adjusts the natural gas flow rate ratio such that all the natural gas supplied to the combustor 12 is injected from the first injection portion 22*a* of the first burner 13 and that no natural gas is injected from the second injection portion 22*b* of the second burner 14.

Furthermore, for example, in a case where the co-firing ratio is lower than the value R1 in FIG. 2, the control device 18 adjusts the natural gas flow rate ratio such that a part of the natural gas supplied to the combustor 12 is injected from the second injection portion 22*b* of the second burner 14. Specifically, in a case where the co-firing ratio is lower than the value R1 in FIG. 2, the control device 18 adjusts the natural gas flow rate ratio such that the ratio of the natural gas flow rate of the second injection portion 22*b* to the total flow rate of the natural gas increases as the co-firing ratio decreases.

Even in a case where the natural gas flow rate ratio is adjusted on the basis of the co-firing ratio, as in the case where the natural gas flow rate ratio is adjusted on the basis of the temperature of the first combustion region 12*a*, the temperature of the first combustion region 12*a* can be suppressed from exceeding the upper limit temperature, and thus damages to the devices due to the flame can be suppressed. Furthermore, since the temperature of the first combustion region 12*a* can be suppressed from excessively decreasing, flame stability in the first combustion region 12*a* is secured.

The control device 18 may adjust the natural gas flow rate ratio on the basis of the load of the engine E1. For example, information of the load of the engine E1 that changes in accordance with a preset schedule is input to the control device 18. The control device 18 can acquire the load of the engine E1 using the information. For example, in a case where the load of the engine E1 is smaller than the value L1 in FIG. 3, the control device 18 adjusts the natural gas flow rate ratio such that all of the natural gas supplied to the combustor 12 is injected from the first injection portion 22*a* of the first burner 13 and that no natural gas is injected from the second injection portion 22*b* of the second burner 14.

Furthermore, for example, in a case where the load of the engine E1 is larger than the value L1 in FIG. 3, the control device 18 adjusts the natural gas flow rate ratio such that a part of the natural gas supplied to the combustor 12 is injected from the second injection portion 22*b* of the second burner 14. Specifically, in the case where the load of the engine E1 is larger than the value L1 in FIG. 3, the control device 18 adjusts the natural gas flow rate ratio such that the ratio of the natural gas flow rate of the second injection portion 22*b* to the total flow rate of the natural gas increases as the load of the engine E1 increases.

Even in a case where the natural gas flow rate ratio is adjusted on the basis of the load of the engine E1, as in the case where the natural gas flow rate ratio is adjusted on the basis of the temperature of the first combustion region 12*a*, the temperature of the first combustion region 12*a* can be suppressed from exceeding the upper limit temperature, and thus damages to the devices due to the flame can be suppressed. Furthermore, since the temperature of the first combustion region 12*a* can be suppressed from excessively decreasing, flame stability in the first combustion region 12*a* is secured.

The control device 18 may adjust the natural gas flow rate ratio on the basis of the total calorific value of the ammonia and the natural gas. For example, information of the load of the engine E1 that changes in accordance with a preset schedule is input to the control device 18. The control device 18 can acquire the total calorific value of the ammonia and the natural gas by using the information. The total calorific value is correlated with the load of the engine E1. Therefore, for example, when the total calorific value is smaller than a threshold value, the control device 18 adjusts the natural gas flow rate ratio such that all of the natural gas supplied to the combustor 12 is injected from the first injection portion 22*a* of the first burner 13 and that no natural gas is injected from the second injection portion 22*b* of the second burner 14.

Furthermore, for example, in the case where the total calorific value is larger than the threshold value, the control device 18 adjusts the natural gas flow rate ratio such that a part of the natural gas supplied to the combustor 12 is injected from the second injection portion 22*b* of the second burner 14. Specifically, in the case where the total calorific value is larger than the threshold value, the control device 18 adjusts the natural gas flow rate ratio such that the ratio of the natural gas flow rate of the second injection portion 22*b* to the total flow rate of the natural gas increases as the total calorific value increases.

Even in a case where the natural gas flow rate ratio is adjusted on the basis of the total calorific value of the ammonia and the natural gas, as in the case where the natural gas flow rate ratio is adjusted on the basis of the temperature of the first combustion region 12*a*, the temperature of the first combustion region 12*a* can be suppressed from exceeding the upper limit temperature, and thus damages to the devices due to the flame can be suppressed. Furthermore, since the temperature of the first combustion region 12*a* can be suppressed from excessively decreasing, flame stability in the first combustion region 12*a* is secured.

In the above description, the temperature of the first combustion region 12*a*, the co-firing ratio, the load of the engine E1, and the total calorific value have been described as parameters used for adjusting the natural gas flow rate ratio. However, a plurality of types of parameters among these parameters may be used in combination as parameters used for adjusting the natural gas flow rate ratio. In addition, parameters other than the parameters described above may be used as parameters used for adjusting the natural gas flow rate ratio.

From the viewpoint of securing the flame stability in the first combustion region 12*a*, it is preferable that a device described later be applied to the air injection portion 23*a* of the first burner 13. Hereinafter, such a device will be described with reference to FIG. 4.

Figure 4:
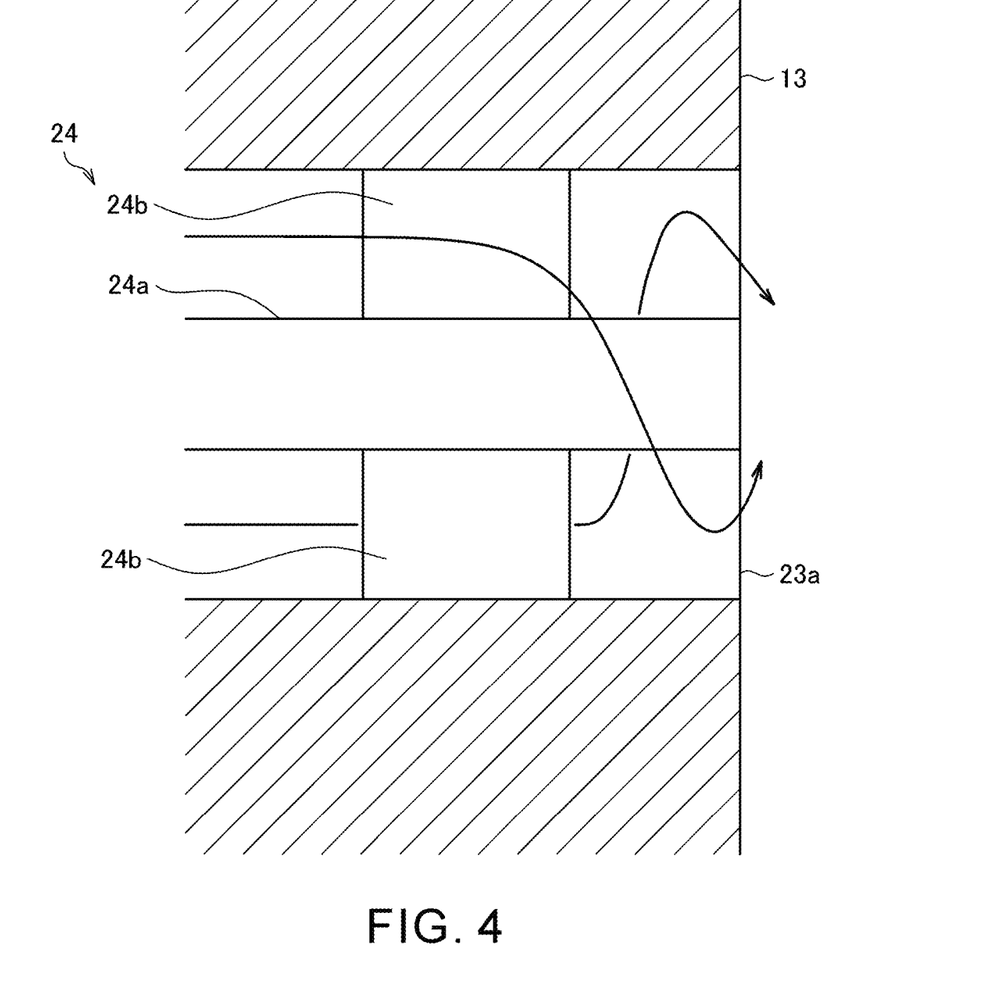
FIG. 4 is a diagram illustrating an example of a configuration of an air injection portion of a first burner according to the embodiment of the present disclosure.

FIG. 4 is a diagram illustrating a configuration example of the air injection portion 23*a* of the first burner 13. As illustrated in FIG. 4, the first burner 13 includes a swirling portion 24. The swirling portion 24 swirls the air injected from the air injection portion 23*a* of the first burner 13. In the example of FIG. 4, the swirling portion 24 includes a shaft 24*a* and a swirl vane 24*b*. The shaft 24*a* extends, for example, on the central axis of the air flow path in the air injection portion 23*a*. The swirl vane 24*b* extends outward in the radial direction of the shaft 24*a* from the outer curved surface of the shaft 24*a*. For example, a plurality of the swirl vanes 24*b* is provided at intervals in the circumferential direction of the shaft 24*a*. As a result, as indicated by an arrow in FIG. 4, a turning force is imparted to the air flowing through the air injection portion 23*a*. However, the swirling portion 24 is not limited to the example of FIG. 4 as long as the air injected from the air injection portion 23*a* of the first burner 13 can be swirled.

As described above, the first burner 13 includes the swirling portion 24 that swirls the air injected from the air injection portion 23*a* of the first burner 13. As a result, flame stability in the first combustion region 12*a* is secured. However, the swirling portion 24 may be omitted from the first burner 13.

Although the embodiments of the present disclosure have been described with reference to the accompanying drawings, it is naturally understood that the present disclosure is not limited to the above embodiments. It is clear that those skilled in the art can conceive various modifications or variations within the scope described in the claims, and it is understood that they are naturally also within the technical scope of the present disclosure.

The example in which the rotational power transmitted from the turbine 11*b* to the compressor 11*a* is used as the energy for driving the generator in the combustion system 1 has been described above. However, in the combustion system 1, the rotational power transmitted from the turbine 11*b* to the compressor 11*a* may be used for other purposes such as driving a traveling body such as a ship.

In the above, the example in which the ammonia injection portion 21 and the natural gas injection portion 22*a* are separate injection portions in the first burner 13 has been described. However, in the first burner 13, ammonia and natural gas may be mixed in advance and injected from one injection portion to the first combustion region 12*a*. In this case, one injection portion functions as an ammonia injection portion and also functions as a natural gas injection portion. Similarly, in the first burner 13, ammonia and air may be mixed in advance and injected from one injection portion to the first combustion region 12*a*. Similarly, in the first burner 13, ammonia, natural gas, and air may be mixed in advance and injected from one injection portion to the first combustion region 12a. Similarly, in the second burner 14, natural gas and air may be mixed in advance and injected from one injection portion to the second combustion region 12b.

The present disclosure contributes to suppressing damages to devices due to flame in a combustion system, such as a gas turbine system and thus can contribute to, for example, Goal 7 "Ensure access to affordable, reliable, sustainable and modern energy for all" of the Sustainable Development Goals (SDGs).

The invention claimed is:

1. A combustion system comprising:
    a combustor including a first combustion region and a second combustion region continuous with the first combustion region on a downstream side of the first combustion region;
    a first burner including an injection portion of ammonia as first fuel, the injection portion of ammonia facing the first combustion region, and a first injection portion of second fuel not containing nitrogen atoms, the first injection portion facing the first combustion region;
    a second burner including a second injection portion of the second fuel, the second injection portion facing the second combustion region; and
    a control device that adjusts a second fuel flow rate ratio that is a ratio between a flow rate of the second fuel injected from the first injection portion and a flow rate of the second fuel injected from the second injection portion,
    wherein in a case where a temperature of the first combustion region is lower than an upper limit temperature, the control device adjusts the second fuel flow rate ratio such that all the second fuel supplied to the combustor is injected from the first injection portion and that the second fuel is not injected from the second injection portion, and
    wherein in a case where the temperature of the first combustion region reaches the upper limit temperature, the control device adjusts the second fuel flow rate ratio such that a part of the second fuel supplied to the combustor is injected from the second injection portion.

2. The combustion system according to claim 1,
    wherein the control device adjusts the second fuel flow rate ratio on a basis of the temperature of the first combustion region.

3. The combustion system according to claim 1,
    wherein the control device adjusts the second fuel flow rate ratio on a basis of a co-firing ratio that is a ratio of a calorific value of the ammonia to a total calorific value of the ammonia and the second fuel.

4. The combustion system according to claim 2,
    wherein the control device adjusts the second fuel flow rate ratio on a basis of a co-firing ratio that is a ratio of a calorific value of the ammonia to a total calorific value of the ammonia and the second fuel.

5. The combustion system according to claim 1, further comprising:
    an engine including the combustor,
    wherein the control device adjusts the second fuel flow rate ratio on a basis of a load of the engine.

6. The combustion system according to claim 2, further comprising:
    an engine including the combustor,
    wherein the control device adjusts the second fuel flow rate ratio on a basis of a load of the engine.

7. The combustion system according to claim 1,
    wherein the control device adjusts the second fuel flow rate ratio on a basis of a total calorific value of the ammonia and the second fuel.

8. The combustion system according to claim 2,
    wherein the control device adjusts the second fuel flow rate ratio on a basis of a total calorific value of the ammonia and the second fuel.

9. The combustion system according to claim 1,
    wherein the first burner comprises:
    an injection portion of air, the injection portion of air facing the first combustion region; and
    a swirling portion that swirls the air injected from the injection portion of air.

10. The combustion system according to claim 2,
    wherein the first burner comprises:
    an injection portion of air, the injection portion of air facing the first combustion region; and
    a swirling portion that swirls the air injected from the injection portion of air.

* * * * *